US011125550B2

(12) United States Patent
Loferer et al.

(10) Patent No.: US 11,125,550 B2
(45) Date of Patent: Sep. 21, 2021

(54) METHOD AND DEVICE FOR OPTICALLY MEASURING THE SURFACE OF A MEASUREMENT OBJECT

(71) Applicant: MICRO-EPSILON MESSTECHNIK GMBH & CO. KG, Ortenburg (DE)

(72) Inventors: Hannes Loferer, Ortenburg (DE); Reiner Kickingereder, Ortenburg (DE); Josef Reitberger, Rinchnach (DE); Rainer Hesse, Ortenburg (DE); Robert Wagner, Neuburg am Inn (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 0 days.

(21) Appl. No.: 16/627,161

(22) PCT Filed: May 18, 2018

(86) PCT No.: PCT/DE2018/200050
§ 371 (c)(1),
(2) Date: Dec. 27, 2019

(87) PCT Pub. No.: WO2019/007468
PCT Pub. Date: Jan. 10, 2019

(65) Prior Publication Data
US 2020/0158498 A1 May 21, 2020

(30) Foreign Application Priority Data
Jul. 4, 2017 (DE) ................ 10 2017 211 377.4

(51) Int. Cl.
*G01B 11/25* (2006.01)
*G06T 5/00* (2006.01)
*H04N 5/243* (2006.01)

(52) U.S. Cl.
CPC .............. *G01B 11/25* (2013.01); *G06T 5/006* (2013.01); *H04N 5/243* (2013.01)

(58) Field of Classification Search
CPC .......... G01B 11/25; G06T 5/006; H04N 5/243
(Continued)

(56) References Cited
U.S. PATENT DOCUMENTS 6,256,010 B1 * 7/2001 Chen .................... G09G 3/3611
345/690
2007/0206204 A1 * 9/2007 Jia ...................... G01B 11/2527
356/604

OTHER PUBLICATIONS

Liu Miao et al. "an accurate projector gamma correction method for phaseOeausring profilometry based on direct optical power detection", Visual Communications and Image Processing; Jan. 20, 2004-20-2004; San Jose, vol. 9677, Oct. 8 (Oct. 8, 2015), p. 9677ID-0677ID, XP06005870, DOI: 10.1117/12.219966. Oct. 8, 2015.*

(Continued)

*Primary Examiner* — Patricia I Young
(74) *Attorney, Agent, or Firm* — Jason P. Mueller; FisherBroyles, LLP

(57) ABSTRACT

A method of optically measuring a surface of a measurement object is disclosed. The method includes generating image light having an image pattern, projecting the generated image light onto the measurement object, and recording influenced light having an influenced image pattern. The image light is generated by an image generation device and the influenced light is captured by a capturing device. The influenced light is light that is reflected, scattered, diffracted, and/or transmitted by the measurement object based on interaction of the image light with the measurement object. The method further includes applying a correcting function to the image light. The correction function alters the image light such that the influenced image pattern recorded by the (Continued)

capturing device shows temporally and/or locally an at least approximately constant and/or homogenous and/or linear brightness. A device having an image generation device, image capture device, and correcting device is also disclosed.

9 Claims, 14 Drawing Sheets

(58) Field of Classification Search
USPC .......................................................... 348/136
See application file for complete search history.

(56) References Cited

OTHER PUBLICATIONS

Liu et al., "An accurate projector gamma correction method for phase-measuring profilometry based on direct optical power detection", SPIE 9677, AOPC 2015, Optical Test and Measurement, and Equipment, 96771D, Oct. 8, 2015.

Dai et al, "Single-shot color fringe projection for three-dimensional shape measurement of objects with discontinuities", Applied Optics, vol. 51, No. 12, Apr. 20, 2012.

Hoang et al., "Generic gamma correction for accuracy enhancement in fringe-projection profilometry", Optics Letter, vol. 35, No. 12, Jun. 15, 2010.

\* cited by examiner

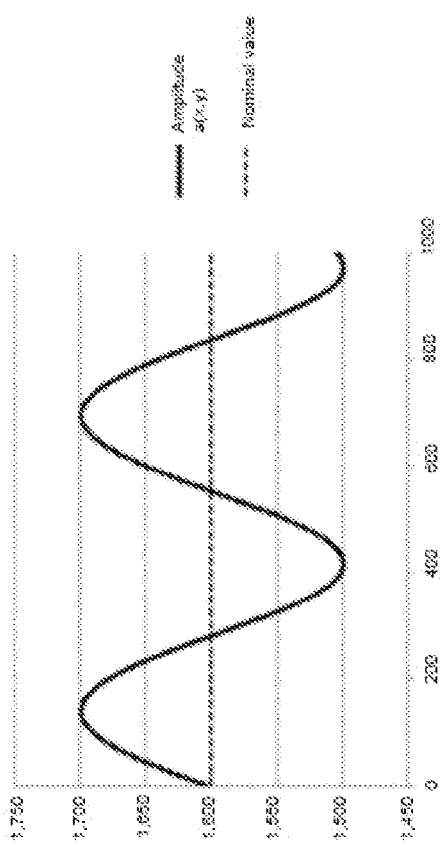

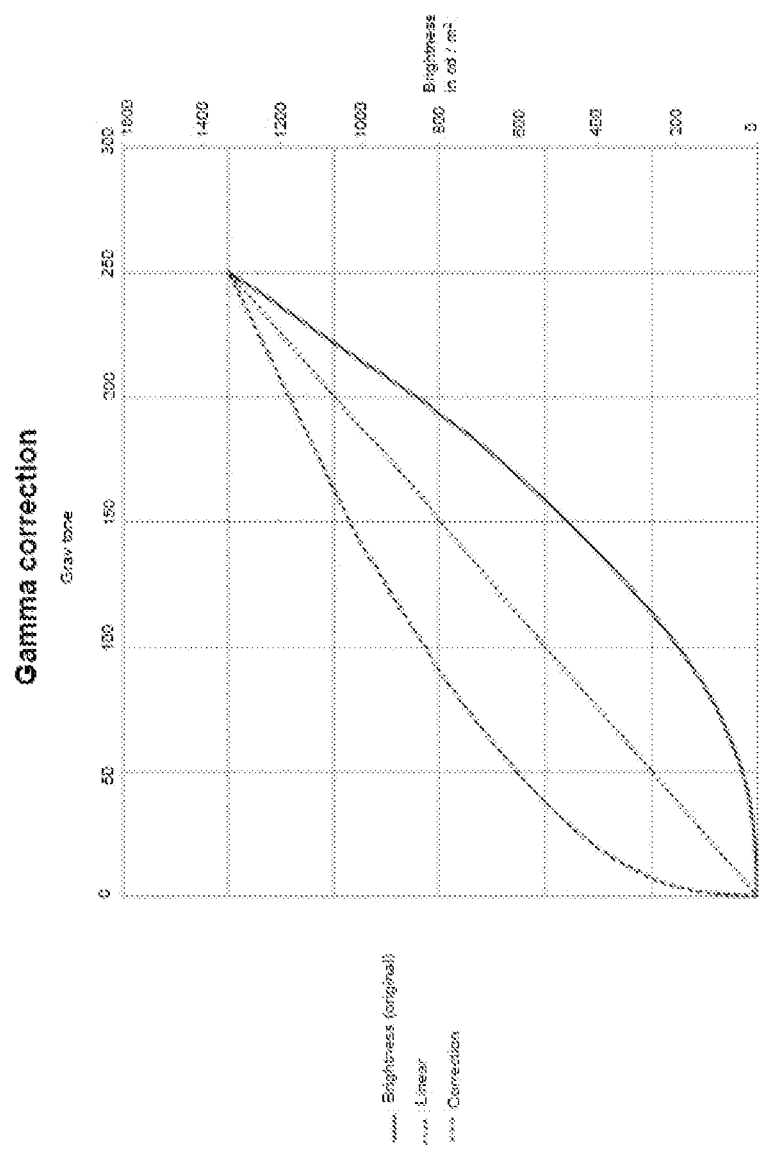

METHOD AND DEVICE FOR OPTICALLY MEASURING THE SURFACE OF A MEASUREMENT OBJECT

CROSS-REFERENCE TO RELATED APPLICATIONS

This application is a national stage entry under 35 U.S.C. 371 of PCT Patent Application No. PCT/DE2018/200050, filed on May 18, 2018, which claims priority to German Patent Application No. 10 2017 211 377.4, filed on Jul. 4, 2017, the entire contents of each of which is incorporated herein by reference.

This disclosure relates to a method for optically measuring the surface of a measurement object, wherein an image generating device is used to display an image pattern, which is projected onto said measuring object, and wherein the image pattern, which is influenced by the measurement object through reflection, scattering, diffraction and/or transmission, is recorded by a capturing device. This disclosure also relates to a device for implementing the method according to the disclosure, comprising an image generating device for displaying an image pattern as well as a capturing device for recording the image pattern that was influenced by the measuring object through reflection, scattering or transmission.

To carry out optical surface measurements, image processing methods are often used and corresponding devices are employed in which an image pattern is influenced by the surface and the influenced image pattern is recorded with a camera. The image pattern is generated or displayed respectively, for example, via an illuminated screen, via a projector or with the aid of a display monitor, and the image pattern is projected onto the surface to be investigated. The image pattern is influenced by reflection, scattering, diffraction or transmission on the surface to be investigated, wherein the influenced image pattern is recorded with a camera. The recorded and influenced image patterns are then processed with a computer and measuring results are calculated from that. Conclusions can be drawn concerning the characteristics of the surface from the known pattern characteristics and the image pattern changed or influenced by the surface of the measurement object. Often inspected surface characteristics are shape, geometry, faults, defects or texture etc.

Known measuring methods for surface inspection are, for example, the moiré method, strip projection or deflectometry. Often used for displaying the pattern are commercial projectors (LCD projector) or computer or TV screens. These are mainly designed for the consumer sector and for viewing with the human eye. The eye unconsciously compensates for many objective errors of a monitor, which creates a correct image expression. Cameras on the other hand pick up gray tones or colors so that objective errors of a monitor, for example, are also contained in the resulting images.

One basic problem with metrological image processing occurs through a temporal change in the brightness of the images as well as through a localized change in the brightness of the images. In downstream algorithms of image processing this may lead to artefacts that falsify the measurement results. Furthermore, this may lead to overexposure or underexposure of images or image sections that can make the measurements unusable.

Deviations in brightness may have different causes. One of the problems is that projectors and monitors are designed for the human eye and not for a camera. The human eye has a gamma of approximately 0.3 to 0.5, whereas the gamma of a monitor is around 2.2 (Windows) and 1.8 (Mac) respectively. Cameras for image processing have usually a linear gamma correction, that is, gamma=1. This causes the brightness values of the resulting images to be non-linear, which makes them unusable for exact metrology.

A further reason for brightness deviations is the inhomogeneous surface brightness of the monitor since it depends on the backlight used (edge LED, full LED, edge cold cathode etc.). This often causes the monitor to be brighter in the center of the screen than at the edge, which causes brightness deviations in the image depending on where the line of sight of the camera impacts the monitor.

A further problem lies in the fact that the radiation characteristic of monitors is largely designed for frontal viewing by a person. However, when performing a surface inspection, viewing from the side is often necessary since the monitor is only viewed indirectly via the surface to be investigated (in deflectometry on reflective surfaces, for example, angle of incidence=angle of reflection applies). This causes brightness deviations depending on the viewing angle.

Further disadvantages in surface inspection occur if changeable image patterns are used, for example, black-and-white patterns with varying design (e.g., changing gray codes), or gray tone patterns with varying phases or amplitudes. This causes a change in overall brightness (surface brightness), and thus also in the brightness recorded by the camera, when changing from one image pattern to the next. In this instance the camera must be adjusted so that it does not overmodulate. A further disadvantage is that, due to changing image patterns the brightness within the image changes, which may lead to artefacts in image processing ("position of the sun").

It is thus the object of the disclosure to design and further develop a method and a device of the kind described at the outset so that precise surface measurement is possible in a simple manner.

Said object is met, according to the disclosure, through the characteristics of claim 1. The method in question is characterized in that, by application of a correcting function, the image generating device and thus the displayed image pattern is adapted in such a way that the influenced image pattern, which was recorded by the capturing device, displays temporally and/or locally an approximately constant and/or homogenous and/or linear brightness.

According to the disclosure it was initially recognized that the object of the disclosure can be met in that the temporal and/or local brightness of the image pattern generated or displayed respectively by the image generating device is targeted specifically. For example, a correcting function is used to adapt the image pattern to be displayed or shown by the image generating device. This makes it possible to prevent or at least reduce artefacts in the subsequent image processing step.

At this point attention is drawn to the fact that the term "displayed image pattern" is to be understood as the image pattern displayed by the image generating device that is projected onto the surface to be investigated. The "influenced image pattern" is the image pattern changed or influenced by the measurement object through reflection, scattering, diffraction or transmission.

By application of the correcting function the gamma correction or the gamma respectively of the image generating device is adapted, in an advantageous manner, to the gamma correction or the gamma of the capturing device. In this instance it was recognized that image generating devices often have a presetting that is unsuitable for the capturing device. For example, the brightness is adjusted ex-factory so that, for the human eye, the brightness from dark to bright increases almost linearly. Through the so-called gamma correction the gamma of the human eye (in the range of 0.3 to 0.5) is overcompensated in the image generating device by setting a higher gamma value, which generates the impression of a linear brightness. Nevertheless, capturing devices such as cameras, for example, have already an approximately linear response behavior (gamma=1) for image processing, so that the image patterns recorded by the capturing device have a non-linear brightness progression. When calculating based upon gray tones, this leads to an erroneous result, for example when averaging without consideration of the non-linear progression. By adapting the gamma correction or the gamma of the image generating device to the gamma correction or the gamma of the capturing device, a correct progression of the gray tones is achieved.

By application of the correcting function an inhomogeneous brightness distribution of the image generating device may be corrected in an advantageous manner. Image generating devices, for example, monitors, use different types of background lighting: full-surface LED panel, or cold cathode emitter or LEDs or on the edges (edge LED). The light is distributed as homogenously as possible over the monitor area using light-conducting plastic panels. However, the distribution is not ideal so that there are areas with higher and lower brightness. Said differences in brightness can be measured and a correcting function may be determined from that.

According to a further advantageous embodiment, it is possible to correct inhomogeneities of the image pattern caused by lateral lines of sight by application of the correcting function. Image generating devices, for example, monitors, are usually designed for viewing centrally from the front. The brightness distribution thus corresponds to an emission towards the front. In metrological applications this criterion is often not met since, due to the triangular arrangement, resulting from the three-dimensional depiction, between image generating device, measurement object, and capturing device, lateral sight lines are also possible. Therefore, the brightness impression picked up by the capturing device is also dependent on the viewing direction. In the instance where the arrangement of image generating device, measurement object and image capturing device is known, the brightness may be adapted with a correcting function to the—possibly even changing—geometric arrangement.

Moreover, it is conceivable that, by application of the correcting function, the gray tone distribution and/or the color distribution of a series of successively displayed image patterns is adapted in such a way that each of the image patterns has at least approximately the same overall brightness. In other words, the correcting function is able to correct the brightness of individual images depending on image content. In the instance of light images (those are images with a high white content in the pattern, e.g., gray code with many white blocks, or sine patterns with a varying number of maximums and minimums in the image) the gray tones can be corrected in such a manner that successive images have the same overall brightness.

According to a further advantageous embodiment the correcting function may be used to adapt the geometric arrangement of the image pattern to or at the image generating device. For example it is possible to adapt the width of a sinusoidal image pattern to the width of the monitor so that with changing sinusoidal image patterns the overall brightness remains at least almost the same.

Explicit attention is drawn to the fact that the correcting function does not necessarily have to be a mathematical function. For example a lookup table may be used as correcting function. With such a table, input values are mapped to output values so that corrected output values are generated depending on the input. The correcting function may, moreover, depend on the physical characteristics of the image generating device. For example the internal gamma of a monitor is usually realized by a lookup table (LUT) in the firmware. The firmware depicts gray values on the monitor in such a way that the signal is calculated with a computer using values from the LUT in order to achieve a desired impression of brightness. A correcting function may, for example, be implemented as a corrected LUT in the monitor firmware, thus achieving a linear gray tone progression.

Alternatively or in addition, the correcting function may depend on the (design-related) brightness distribution of the image generating device. Thus, the center brightness of the image generating device may, for example, be reduced through a location-dependent correcting function, for example a correcting polynomial or a polynomial of the $n^{th}$ degree. In this instance the correcting function is therefore a mathematical function. The images displayed by the image generating device may be brightened along the edge and darkened in the center so that the image pattern display has a homogenous distribution across the surface of the image generating device, for example, a monitor.

In other words, it is conceivable that the correcting function is any—arbitrary—mathematical function that provides modified output values depending on the input values, with a linear function superimposed if required. The mathematical function may be a spatially and/or temporally changeable function. With a spatial function it is possible, for example, to change the brightness deviations within an image displayed on the image generating device in one or two directions, that is, one-dimensional or two-dimensional (flat). With a temporally changing function the change in brightness in successive images may be adapted. According to an advantageous embodiment, the correcting function may act spatially in one or two axes and/or may vary temporally.

The image generating device includes a projector, a monitor or a screen for depicting the image pattern and/or the capturing device is provided with a camera for recording the influenced image pattern.

The object under discussion is, moreover, met by the characteristics of claim 12. Accordingly, a device for implementing the method according to any of the claims 1 to 11, comprising an image generating device for displaying an image pattern and a capturing device for recording the image pattern that was influenced by the measurement object through reflection, scattering, diffraction and/or transmission, characterized in that the image generating device is provided with a correcting device which, via a correcting function, adapts the depicted image pattern in such a way that the influenced image pattern, which was recorded by the capturing device, has temporally and/or locally a at least approximately constant and/or homogenous and/or linear brightness.

Attention is drawn to the fact that the characteristics described above concerning the method according to the disclosure may also have a device-related form. A combination of these characteristics with the characteristics that concern the device claim is not only possible but is advantageous and expressly part of the disclosure.

There are now different possibilities for implementing and further developing the teaching of this disclosure in an advantageous manner. Reference is made on the one hand to the claims following claim 1 and on the other hand to the following description of exemplary embodiments of the disclosure by way of the drawing. In conjunction with the description of the exemplary embodiments of the disclosure by way of the drawing, generally embodiments and further developments of the teaching are described. The drawing shows in:

FIG. 1 a schematic representation of an exemplary embodiment of a device for implementing the method according to an embodiment;

FIG. 2 the recording of an image pattern projected onto a measurement object;

FIG. 3 a curvature diagram calculated from the recording in FIG. 2;

FIG. 4 the brightness distribution of a monitor that serves as image generating device;

FIG. 5 a correcting function for the brightness distribution according to FIG. 4;

FIG. 6 the sinusoidal image pattern that extends over the surface of a monitor that serves as image generating device;

FIG. 7 the sinusoidal image pattern of FIG. 6 changed by the correcting function as per FIG. 5;

FIG. 8 a curvature diagram optimized by the method according to an embodiment;

FIG. 9 a sinusoidal intensity distribution across the width of a monitor that serves as image generating device;

FIG. 10 an non-adapted intensity distribution across the width of a monitor that serves as image generating device;

FIG. 11 four sinusoidal intensity distributions that are not adapted to the width of a monitor, which serves as image generating device, after reflection from the surface of a measurement object;

FIG. 12 as an example, the intensity resulting from FIG. 11 in a modulation diagram;

FIG. 13 as an example, the intensity resulting from FIG. 12 in an amplitude diagram; and FIG. 14 the gamma of a commercially available monitor with a suitable correcting function selected.

FIG. 1 depicts a schematic view of an exemplary design of a device according to the disclosure for implementing the method according to the disclosure. The device includes an image generating device 1, for example a monitor. The image generating device 1 depicts an image pattern that is projected onto a measurement object 2. The measurement object 2 may, for example, be a painted motor vehicle, the surface of which is to be optically measured. The apparatus, moreover, includes a capturing device 3, for example, a camera, the line of sight 7 of which is shown in FIG. 1. The capturing device 3 records the image pattern influenced on the measurement object 2 through reflection, scattering, diffraction and/or transmission. To optimize the image pattern projected onto the measurement object, the image generating device 1 includes a correcting device 4.

The optical surface measurement, for example the phase-shifting deflectometry, requires recordings of image patterns displayed on an image generating device 1, for example a monitor, with, for example, sinusoidal strips that reflect on the surface of the measurement object 2 to be inspected. For each pixel of a camera, which serves as capturing device 3, the amplitude and phase position of the depicted sine pattern is calculated from the recorded, influenced image patterns. The more pronounced the amplitude of the sine wave in the recorded image patterns, the more stable are the results of the calculations; a weakly defined signal leads to increased measuring noise.

It is possible to optimize a weakly defined signal by changing the recording parameters (e.g., exposure time). However, the recording parameters must be chosen such that the dynamic range of the camera 3 is not exceeded. Cameras 3 usually provide gray tones in the range of 0-255. The value of 255 must not be exceeded within the surface to be measured. Such a supersaturation would lead to the capping of the sine wave and thus its phase position could no longer be determined unambiguously.

Ideally, the recorded sine pattern covers the full range of 0-255. In practice this is not possible for the following reasons:

Because of a portion of diffused reflection, which depends on the investigated surface of the measurement object 2, the depicted sine pattern is not only reflected directly. Rather, the result is a lower gray value, which consists of a two-dimensional averaging of the radiated amount of brightness of monitor 1.

In operation, scattering in the recorded, influenced image patterns must be taken into consideration. Thus, when setting up the device care must be taken to always leave a corresponding free gap in upward direction.

To keep the setup effort to a minimum it is advantageous to record the measuring positions necessary for a full coverage of a motor vehicle as measurement object 2 with the same parameters. The varying vehicle geometry in the individual positions also influences the intensity of the recorded image patterns and must be taken into consideration accordingly.

FIG. 2 depicts the recording of the reflection of a strip pattern as influenced image pattern using the example of a section of the painted door of a motor vehicle in the area of the grip recess. The recording parameters are set correctly in this example. Nevertheless, the differences in contrast in the sine pattern in individual areas of the recorded image pattern are clearly visible. The first area 5 shows the brightest area of the recorded image pattern with the following characteristics:

No saturation of the recorded image pattern, that is, all gray tones<200, that is, a sufficient gap upwards to the limit of 255.

The darkest pixels have a gray tone of approximately 130, that is, the sine is depicted with a gray tone amplitude of 70. This is sufficient.

In contrast, in the second area 6 the sine strips no longer show sufficient contrast. This leads to noise in the calculated curvature diagram. FIG. 3 shows the curvature diagram for the door section in FIG. 2 with the marked second area 6 in FIG. 2. The brightness drops significantly at this point compared to the remainder of the area.

The surface of the measurement object 2 as reason for this drop in brightness can be excluded per se. It is painted uniformly and reflects everywhere the same. Rather, the following factors are mainly to be considered:

Uneven brightness distribution of the monitor used as image generating device 1:

Commonly used monitors 1 have a drop in brightness of 20-50% at the edge, compared to the center.

Angle-dependency of brightness radiation of monitor 1: The smaller the angle at which the line of sight 7 of the camera 3, which acts as capturing device 3, impacts the monitor 1, the less intensity can be recorded by camera 3.

When comparing the marked areas 5, 6, shown in FIGS. 2 and 3, to each other, a combination of both phenomena leads to the observed drop in brightness:

Area 1:
  Camera 3 sees the reflection of the central area of monitor 1 with the highest intensity of reflected light.
  Lines of sight 7 of camera 3 impact relatively vertically on monitor 1.
Area 2:
  Camera 3 sees the reflection of one of the corners of monitor 1 with correspondingly reduced intensity.
  Lines of sight 7 of camera 3 impact the monitor at a relatively small angle.

Through the disclosed method and device the recording situation is optimized such that the recorded, influenced image pattern exhibits a homogenous brightness distribution.

The fundamental idea of the solution is to modify the sine pattern displayed on monitor 1 to such an extent that the above-described effects are minimized. To record the image of FIG. 2, the sine patterns for all pixels of monitor 1 are shown with the maximum available amplitude from 0 to 255 gray tones. However, as mentioned already, the recording only contains gray tones between 130 and 200. This is caused, among others, also by the diffused reflection of the surface, which is the reason that there is no complete black with a gray tone close to or equal to zero. To improve the recordings, the sine values are therefore multiplied by a correcting value, to even out the varying local brightness spots of monitor 1:
  Corners of monitor 1:
    are darkest,
    the full range of 0-255 has to be utilized, that is, factor 1.
  Center of monitor 1:
    is brightest (e.g., 100% brighter than the corners),
    multiplication of the sine values by a factor of 0.5,
    the range between 0-127 is utilized.

By lowering the brightness in the center of the monitor, the exposure time may be increased without the risk of supersaturation, which increases the recorded contrast in the corners of the monitor.

To begin with, from recordings of white images displayed on monitor 1 the shape of the brightness distribution is determined. FIG. 4 depicts the gray tones of a monitor 1 relative to the position on monitor 1. Shown is a monitor 1 with 1900 pixels in width 8 and 1080 pixels in height 9. The z-axis 10 in FIG. 4 shows the gray tones 11 that are present in the range from 110 to 230. The monitor 1 is brightest in the center, whereas the brightness drops drastically towards the corners.

From this a two-dimensional correcting polynomial may be obtained as correcting function with which the factor required can be calculated for each pixel. The equation of the correcting area depends on the respective monitor type used. Polynomials up to the $4^{th}$ degree with distinctive symmetry in both directions have proven advantageous in practical application.

FIG. 5 shows the correcting function, that is, the correcting values in x and y direction, with which the brightness representation of the monitor is corrected. To this end the gray tones of the image pattern, which is to be shown on monitor 1, are multiplied. An ideal sine wave is usually depicted.

FIG. 6 shows the sinusoidal strips 12, which extend across the height of the monitor 1 (sine pattern in x direction, constant brightness in y direction). The result after correction is a sine wave 13 adapted across the surface of monitor 1 with modified gray tones as shown in FIG. 7. The maximum brightness in the center is reduced compared to the corners. The result is an even brightness distribution of the image pattern across the surface of monitor 1.

Through the described method of determining the correcting polynomial only the uneven brightness distribution of monitor 1 is equalized to start with. The additional effect, caused by the angle-dependent brightness radiation of monitor 1, may be reduced through an overcompensation of the brightness distribution, that is, instead of determining the factors so that the center is depicted with the same brightness as the corners, the corners may intentionally be shown brighter than the center. This is feasible with monitors 1 of a more recent design in which the brightness drop in the corners is only about 25%.

By overcorrecting the brightness distribution of monitor 1 the signal in the corners of the monitor may be improved without the danger of supersaturation in the center of the monitor. In the example analyzed it would even be possible to increase the exposure time again.

The improvement becomes apparent in a significantly reduced noise level in the specific areas, as shown in FIG. 8. This causes a homogenous, noise-less or complete distribution of the measuring values also in the second area 6.

In an entirely analogous manner it would be possible to compensate for the viewing angle-dependent brightness distribution. To that end it would be possible to utilize the azimuth angle and the polar angle, under which the camera 3 observes the reflective surface of the measurement object 2, as correcting function. Instead of the trigonometric functions of sine, cosine (or tangent respectively), which are necessary for this, a linear function that only depends on the width or height, respectively, of monitor 1 could be used as correcting function in a first approximation. Further correcting functions, for example utilizing the LUT, are possible in the same way.

The following describes the mathematical fundamentals of the phase measuring deflectometry, which constitutes an exemplary embodiment of the method according to the disclosure.

Expanded Evaluation of Phase Shifting Deflectometry

Independent from the number k of the equidistant nodes with which the sine strips are sampled (k>2), for each pixel (x,y) three independent pieces of information are evaluated (see equations). To this end, for example, four images ($I_k$ where k=1.4) are recorded, wherein each of the strips has equidistant phase length $\psi_k$(phase shift 90°). The following images may be calculated from these images ($I_k(x,y)$):

Phase Image:

$$\varphi(x,y) = \text{atan } 2[-(I_2-I_4),(I_1-I_3)] \quad \text{(Equation 1)}$$

The phase image acquired point by point results in information concerning the inclination of the object. The so-called 'slope image' is suitable for assessing a plurality of surface defects such as, for example, dents, bumps and paint runs. Through differentiating the 'slope image' is changed into a 'curvature diagram' in which small-scale geometric defects with defined edges are clearly visible. Examples for this are cavities, spots, nicks and scratches.

Gray tone image:

$$I_0(x,y) = \tfrac{1}{4}(I_1+I_2+I_3+I_4) \quad \text{(Equation 2)}$$

The second information channel, the gray tone image, is relatively low in noise through its synthesis from the phase-shifted base images.

Modulation image or contrast image (m, normalized amplitude with respect to the gray tone image):

$$m(x, y) = \frac{a(x, y)}{2I_0(x, y)} = \frac{\sqrt{(I_1 - I_3)^2 + (I_2 - I_4)^2}}{1/2(I_1 + I_2 + I_3 + I_4)} \quad \text{Equation 3}$$

with the amplitude $$a(x,y) = \sqrt{(I_1-I_3)^2+(I_2-I_4)^2} \quad \text{(Equation 4)}$$

The third information channel, the modulation image, depicts how strongly the sine wave is present at a certain point and represents the local gloss level of a surface. This representation provides important information concerning matt areas as they occur, for example, with dirt, scratches and coating defects.

The mean value of brightness contributes to the occurrence of a varying base brightness in the individual image recordings, for example, on partially reflecting and diffusely scattering object surfaces. The reflected portion of the light (essentially the original sine pattern) is additively superimposed through the diffusely scattering portion (essentially the mean brightness of the displayed pattern).

Figure 1:
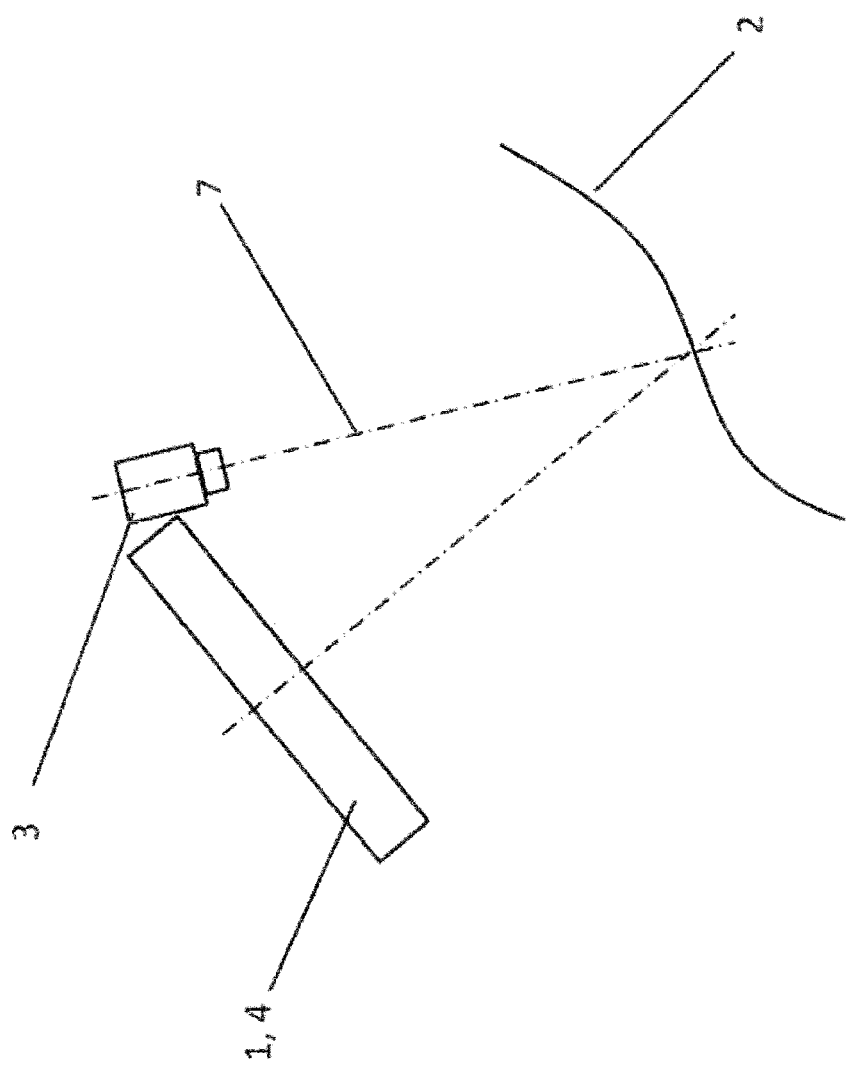
Figure 2:
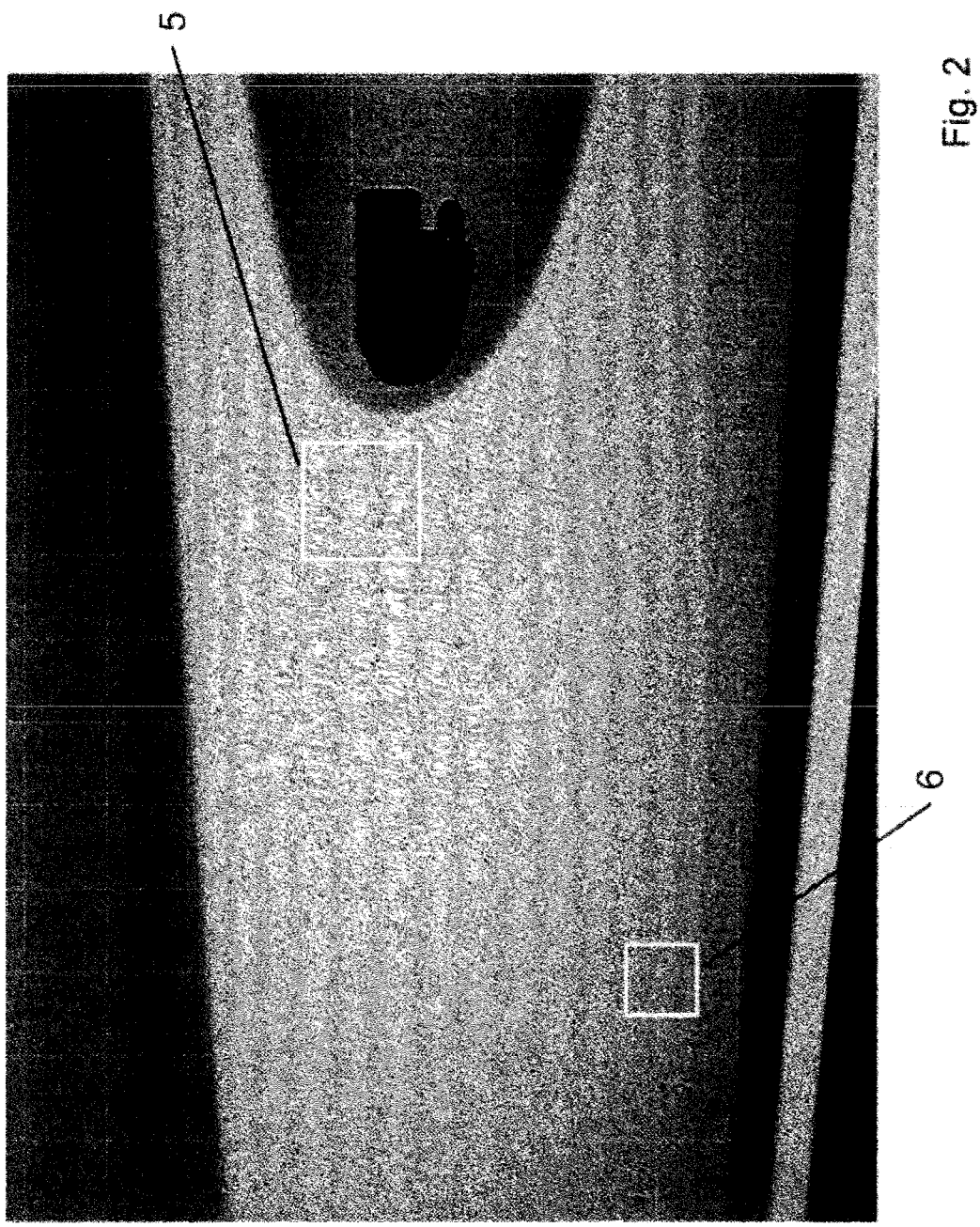
Figure 3:
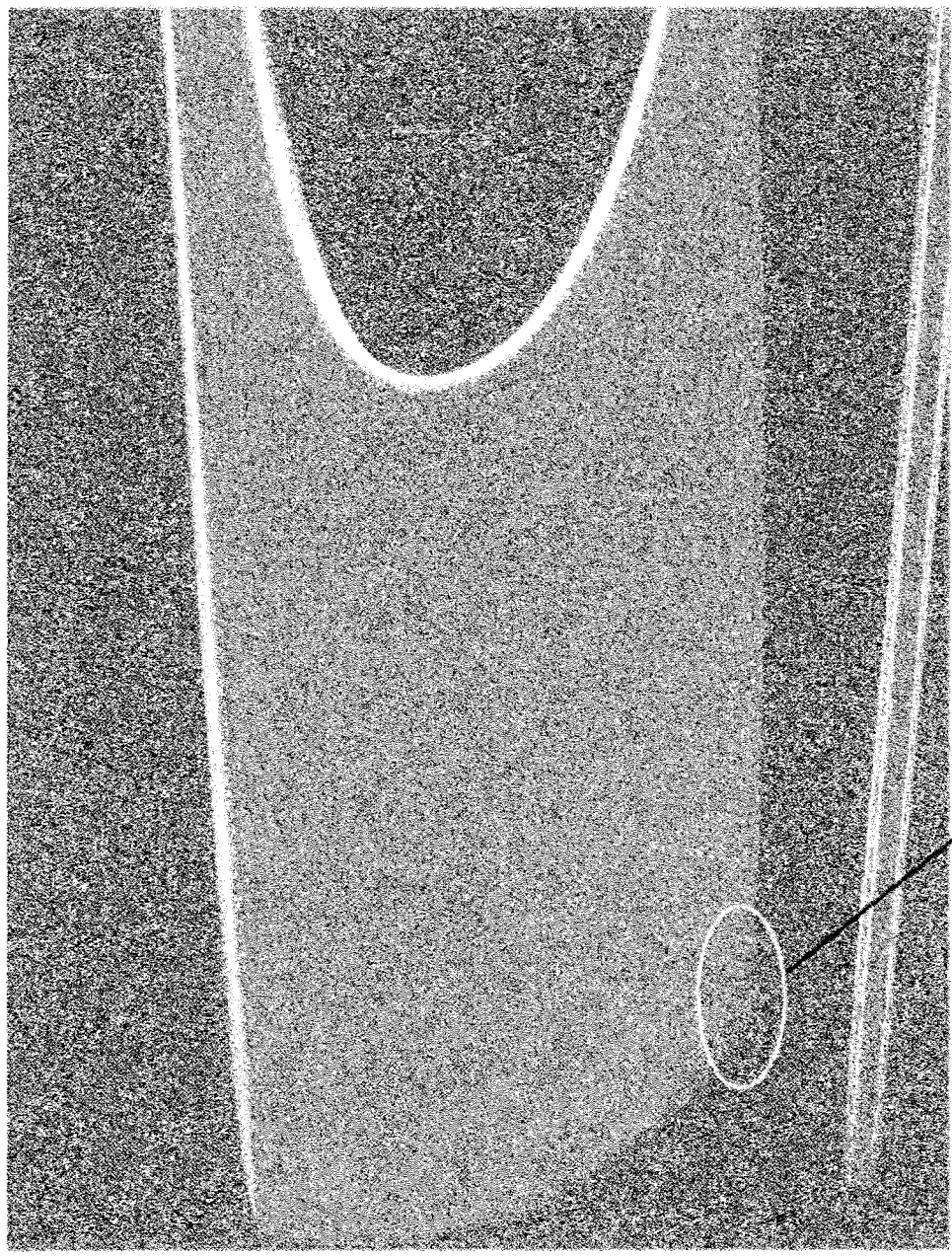
Figure 4:
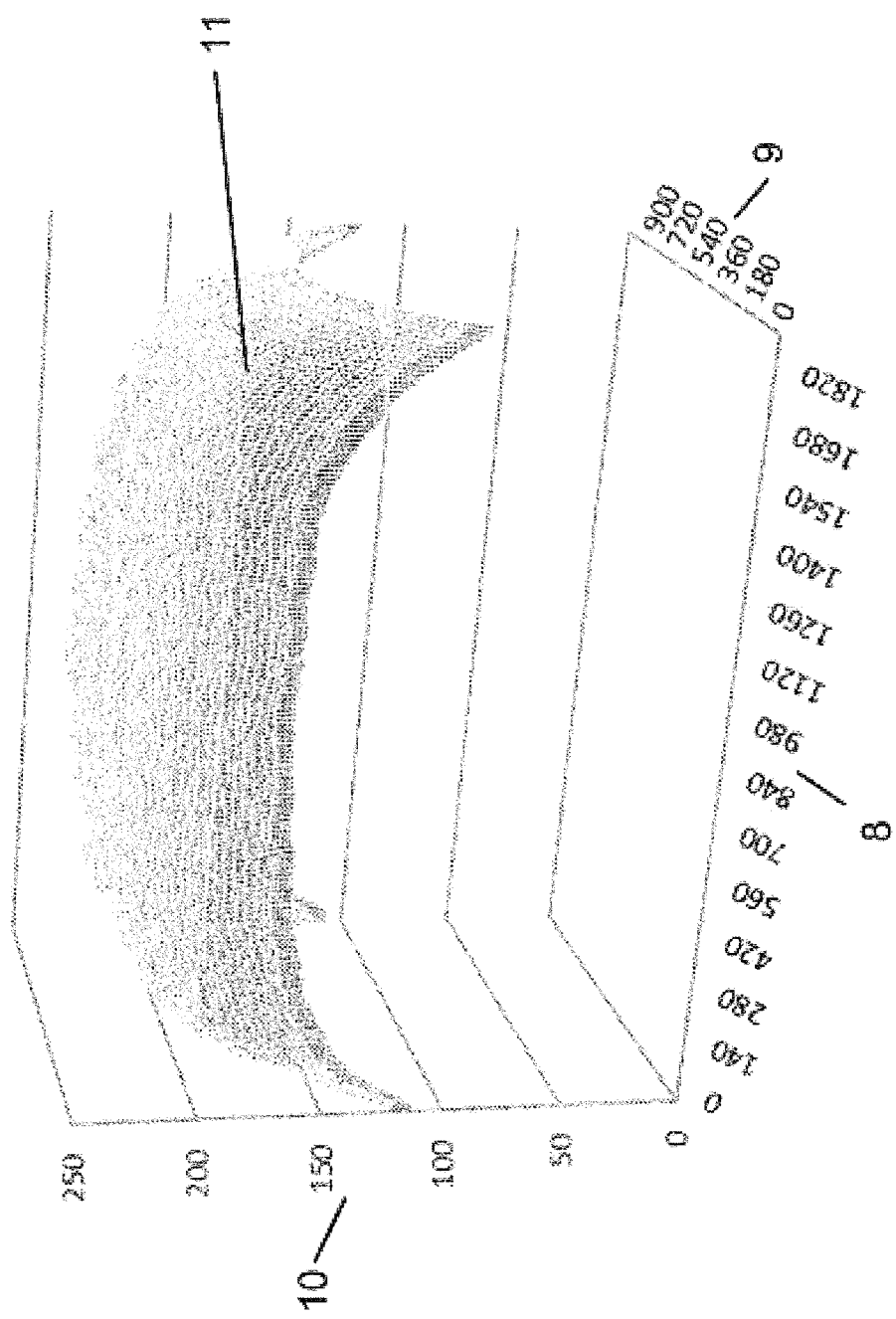
Figure 5:
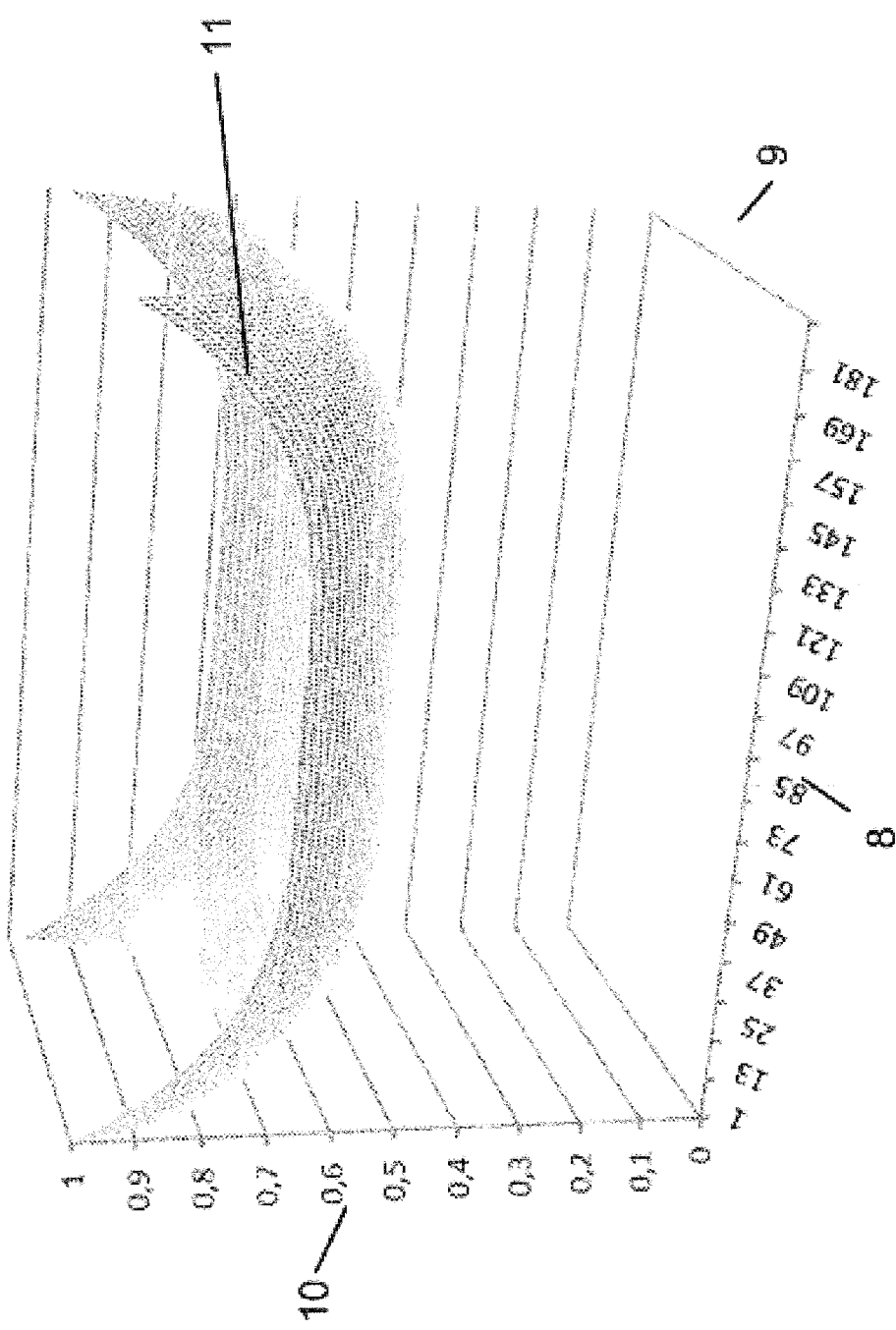
Figure 6:
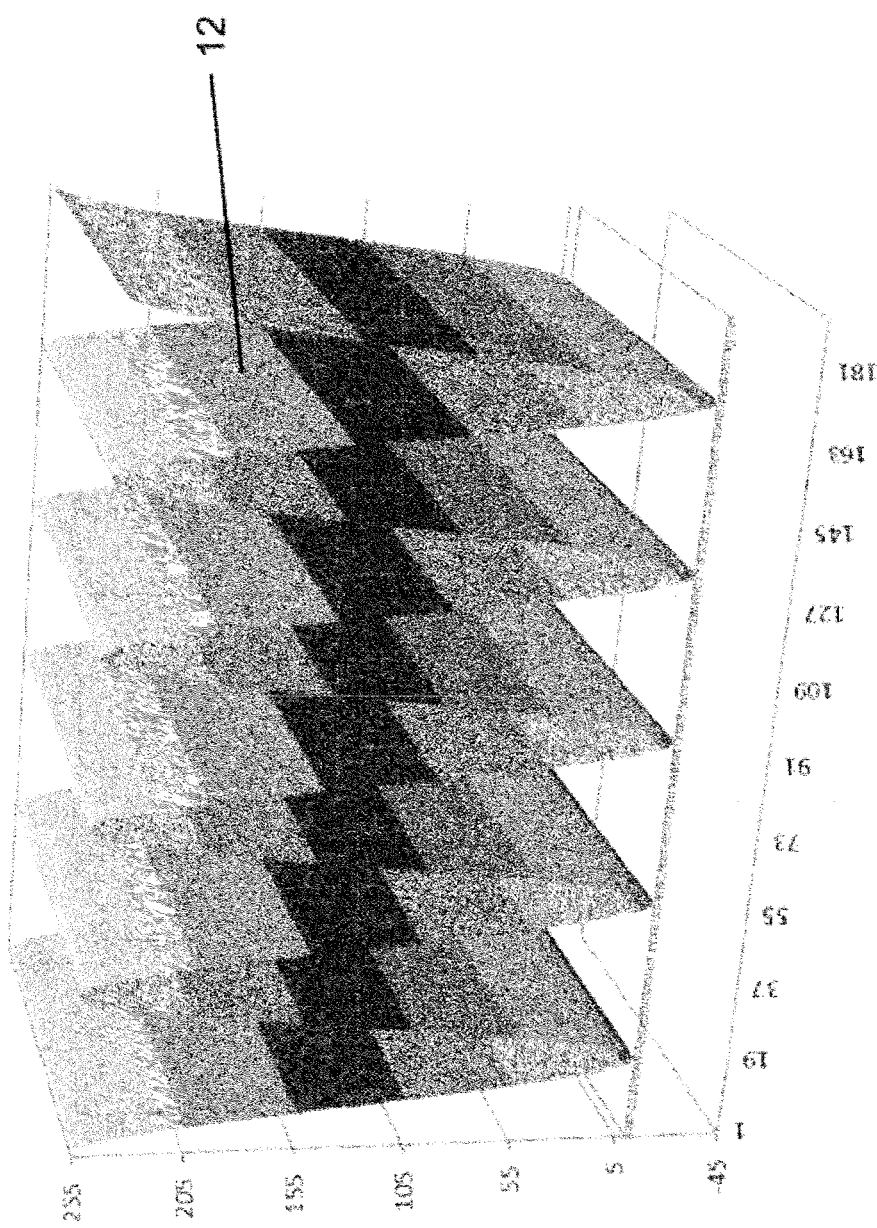
Figure 7:
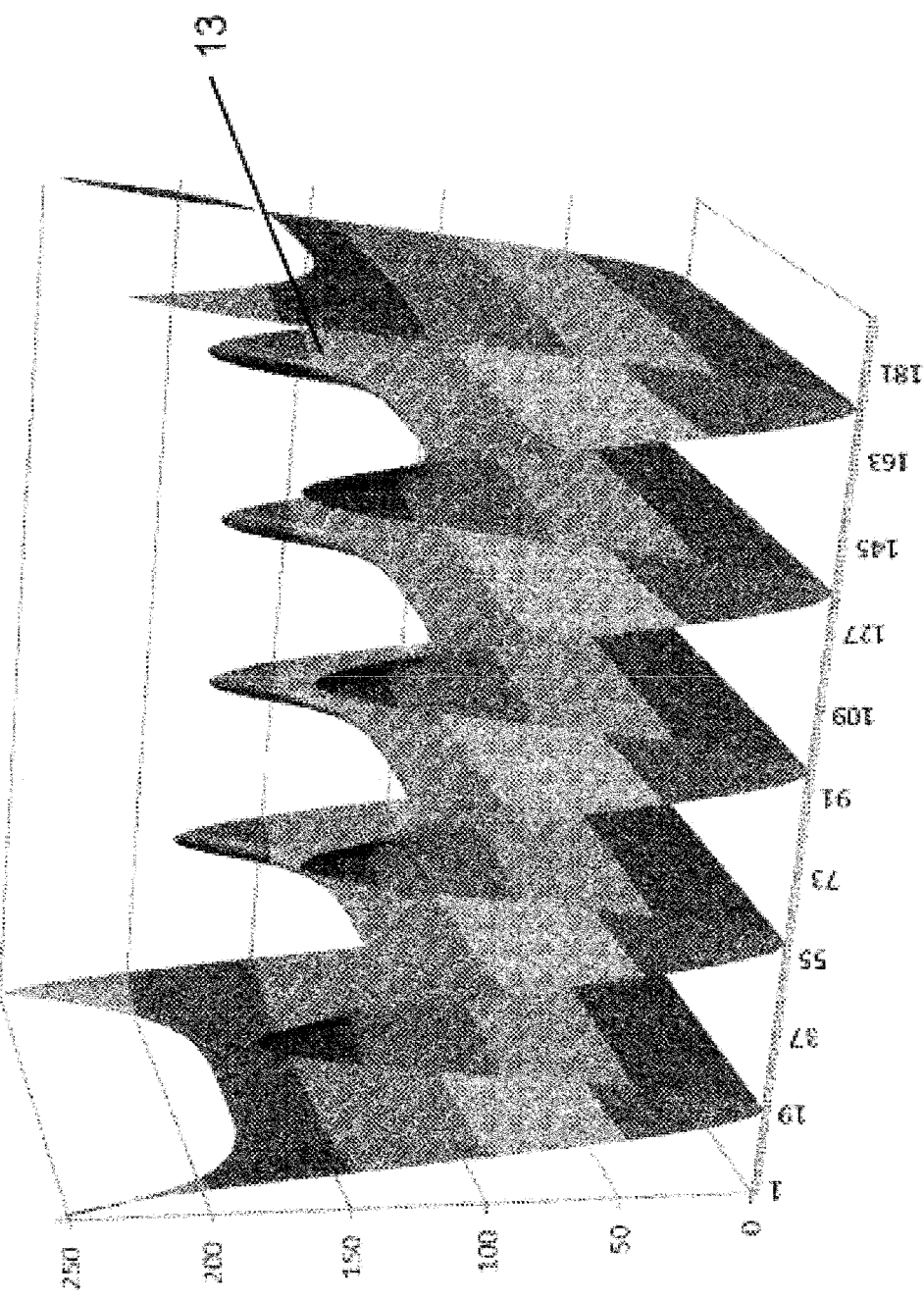
Figure 8:
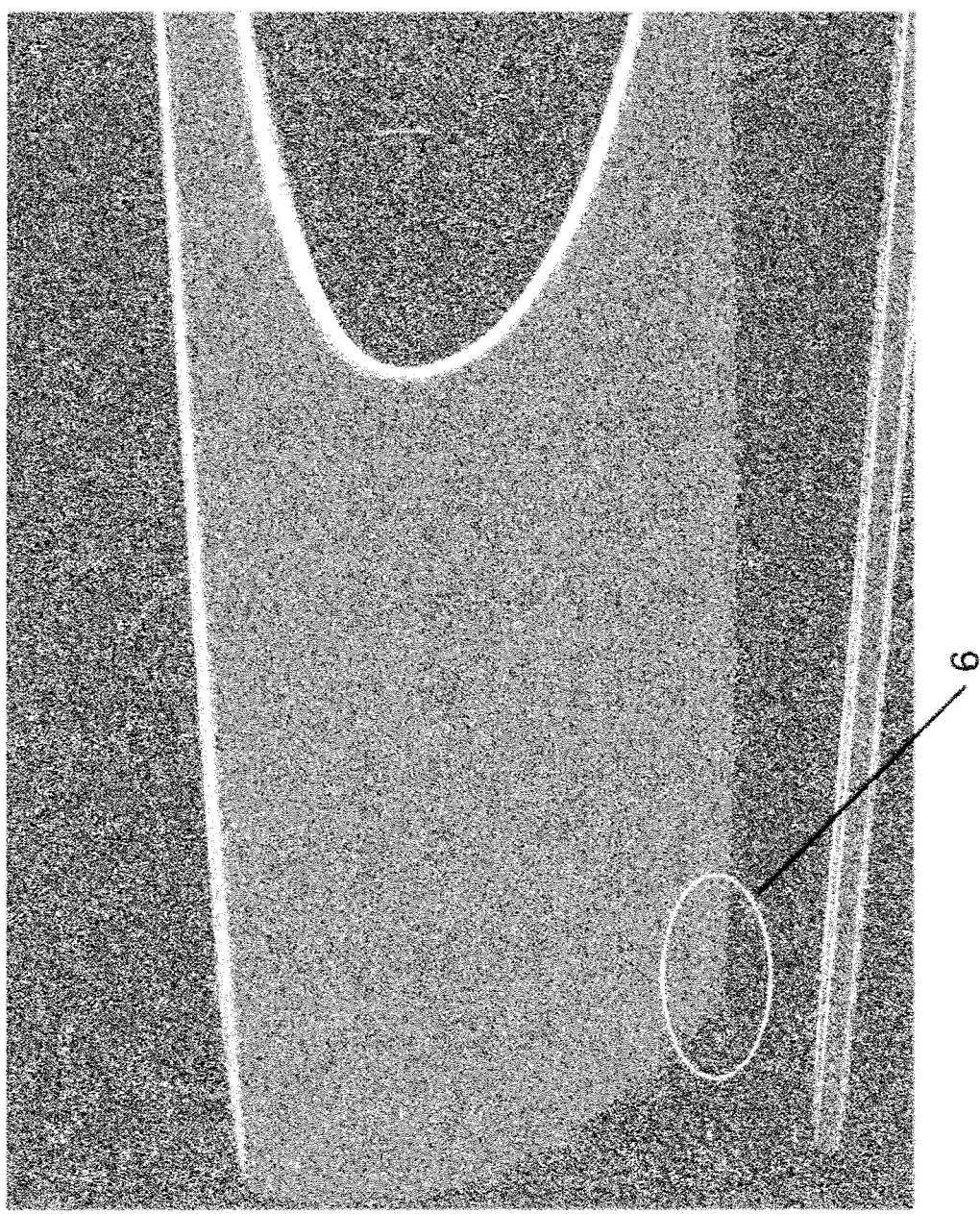
Figure 9:
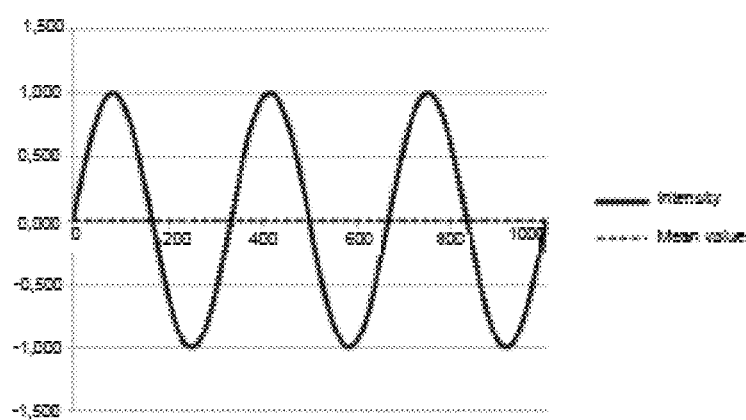
FIG. 9 depicts a sinusoidal intensity distribution across the width of a monitor 1 with 1000 pixels. The monitor width is in this instance an integral multiple of the sine progression, which causes the mean value of the brightness (in FIG. 9 normalized to +/−1) across the full width of monitor 1 to be exactly zero.
Figure 10:
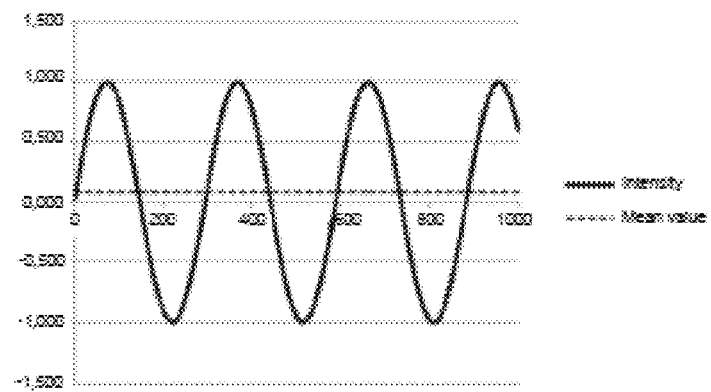
FIG. 10 shows a non-adapted sinusoidal intensity distribution across the width of a monitor 1. The monitor width is in this instance not an integral multiple of the sine progression, which causes the mean value of the brightness across the full width of monitor 1 to be unequal to zero.
Figure 11:
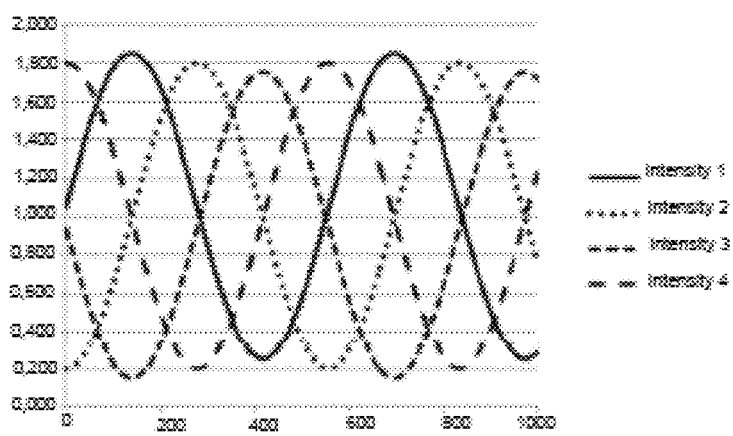
Figure 12:
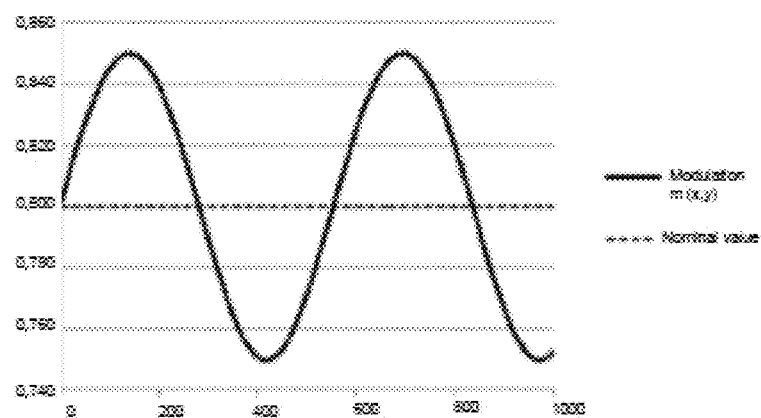

FIG. 11 depicts four sinusoidal intensity distributions, which were not adapted to the width of the monitor, after reflection from the surface of measurement object 2 (that is, essentially the image recorded by camera 3). Each of the sinusoidal intensity distributions phases is offset by 90°, which is the case when using phase measuring deflectometry. Due to the phase shifting principle the individual recordings now depict different parts of the sine progression. The effect shown in FIG. 10 leads initially to varying average brightness displays of the individual sine patterns across the width of the monitor. Thus, superimposition with the diffuse part of the reflection leads to an average brightness offset for each image pattern. This causes a brightness modulation in the resulting modulation image (equation 3) or the amplitude image (equation 4), respectively. With adapted sine representation, the modulation image or the amplitude image, respectively, would show a constant brightness. Equations 3 and 4, respectively, include the intensities of the four images $I_1$ to $I_4$. The adding of four sine waves that are each phase-shifted by 90° and adapted to the width would result in a constant value (across the width) of monitor 1. This is depicted in FIGS. 12 and 13 by the broken line. However, the missing adaptation causes a sinusoidal base modulation (FIG. 12 for the modulation image, FIG. 13 for the amplitude image), which is caused by the unfavorable selection of the sine patterns in conjunction with the diffusely scattering portion of the surface to be measured and which leads to an erroneous interpretation of the obtained measurement data.

Through a correcting function with which the sine representation is adapted to the width of the monitor, this unintended effect can be avoided. The above description applies equally to the height of the monitor 1.

FIG. 14 depicts the gamma of a commercially available monitor 1 (full line). With a suitably chosen correcting function (long broken line) for the brightness display on monitor 1 it is possible to adjust a linear brightness impression on the resulting image (short broken line).

In order to avoid a repeat in the description of further advantageous embodiments of the disclosed method and device, reference is made to the general part of the description as well as the attached claims.

Finally, explicit reference is made to the fact that the afore-described exemplary embodiments of the method and the device only serve as a description of the claimed teaching, and said teaching is not limited to the exemplary embodiments.

LIST OF REFERENCE NUMERALS

1 Image generating device
2 Measurement object
3 Capturing device
4 Correcting device
5 First area
6 Second area
7 Line of sight
8 Width
9 Height
10 z-axis
11 Gray tones
12 Strips
13 Adapted sine wave

The invention claimed is:

1. A method of optically measuring a surface of a measurement object, the method comprising:
   generating, by an image generating device, image light having an image pattern;
   projecting the generated image light onto the measurement object;
   recording, with a capturing device, influenced light having an influenced image pattern, wherein the influenced light is light that is reflected, scattered, diffracted, and/or transmitted by the measurement object based on interaction of the image light with the measurement object,
   wherein generating, by the image generating device, the image light having the image pattern includes applying a correcting function to the image light so that the image pattern is generated such that the influenced image pattern recorded by the capturing device shows temporally and/or locally an at least approximately constant and/or homogenous and/or linear brightness, and the correcting function corrects inhomogeneities caused by lateral lines of sight of the image pattern displayed by the image generating device;
   wherein: the correcting function depends on an inhomogeneous brightness distribution of the image generating device such that the inhomogeneous brightness distribution of the image generating device is corrected by the correcting function, or the correcting function alters the image pattern such that a gray tone distribution and/or color distribution of each of a series of multiple, consecutively displayed image patterns has at least approximately a same overall brightness.

2. The method according to claim 1, further comprising applying the correcting function to the image light such that a gamma correction of the image generating device is the same as a gamma correction of the capturing device.

3. The method according to claim 1, wherein the correcting function alters the image pattern such that a geometric arrangement of the displayed image pattern corresponds to geometric characteristics of the image generating device.

4. The method according to claim 1, further comprising using a lookup table to apply the correcting function.

5. The method according to claim 1, further comprising representing the correcting function as a mathematical function that provides modified output values based on input values.

6. The method according to claim 5, wherein the correcting function further includes an additive linear function superimposed on the mathematical function of claim 5.

7. The method according to claim 3 wherein the correcting function acts spatially in one or two axes, and/or wherein the correcting function varies temporally.

8. The method according to claim 1, wherein:
projecting the generated image light onto the measurement object further comprises projecting the image light by a projector, by an illuminated screen, or by a monitor of the image generating device, and
recording the influenced light further comprises receiving the influenced light by a camera of the capturing device.

9. A device configured to optically measure a surface of a measurement object, the device comprising:
an image generating device configured to generate and display, on the measurement object, image light having an image pattern;

a capturing device configured to record influenced light having an influenced image pattern, wherein the influenced light is light that is reflected, scattered, diffracted, and/or transmitted by the measurement object based on interaction of the image light with the measurement object; and a correcting device configured to apply a correction function to the image light so that the image pattern is generated such that the influenced image pattern recorded by the capturing device shows temporally and/or locally an at least approximately constant and/or homogenous and/or linear brightness, and the correcting function corrects inhomogeneities caused by lateral lines of sight of the image pattern displayed by the image generating device;

wherein applying the correcting function corrects an inhomogeneous brightness distribution of the image generating device; or applying the correcting function alters the image pattern such that a gray tone distribution and/or color distribution of each of a series of multiple, consecutively displayed image patterns has at least approximately a same overall brightness.

* * * * *